Sept. 26, 1944.  S. PRIBULA  2,358,825
FLUID BRAKE
Filed March 4, 1943  2 Sheets-Sheet 1

STEVEN PRIBULA,
INVENTOR.
By: Julian J. Wittal
his attorney.

Sept. 26, 1944.　　　　S. PRIBULA　　　　2,358,825
FLUID BRAKE
Filed March 4, 1943　　　2 Sheets-Sheet 2

STEVEN PRIBULA,
INVENTOR.
By: Julian J. Wittal
his attorney.

Patented Sept. 26, 1944

2,358,825

UNITED STATES PATENT OFFICE 2,358,825

FLUID BRAKE

Steven Pribula, New York, N. Y.

Application March 4, 1943, Serial No. 477,907

5 Claims. (Cl. 188—90)

This invention relates to brake devices for automobiles, but also for other kinds of vehicles, trains, and generally for any rotating shaft which it is desired to stop.

The main object of my invention is to provide a device of this character which will be more efficient, more reliable and safer than the brake devices heretofore used, or proposed, particularly for motor vehicles.

Another object of my invention is to provide a brake device as characterized hereinbefore, which will act through a fluid medium, and which will be extremely simple in construction and thereby adapted for quick and inexpensive mass manufacturing and easy installing in vehicles.

Still a further object of my invention is to provide a device of the mentioned character which will require very little or no repairs at all, and may be used without any extra care for a long time, and even under very exacting conditions, as to travel, load and speed, and which will keep a motor vehicle under control on a slippery road.

Additional objects of this invention will be apparent, as the specification of the same proceeds.

In the drawings, forming a part of this specification and accompanying the same

Figures 1, 3, 4:
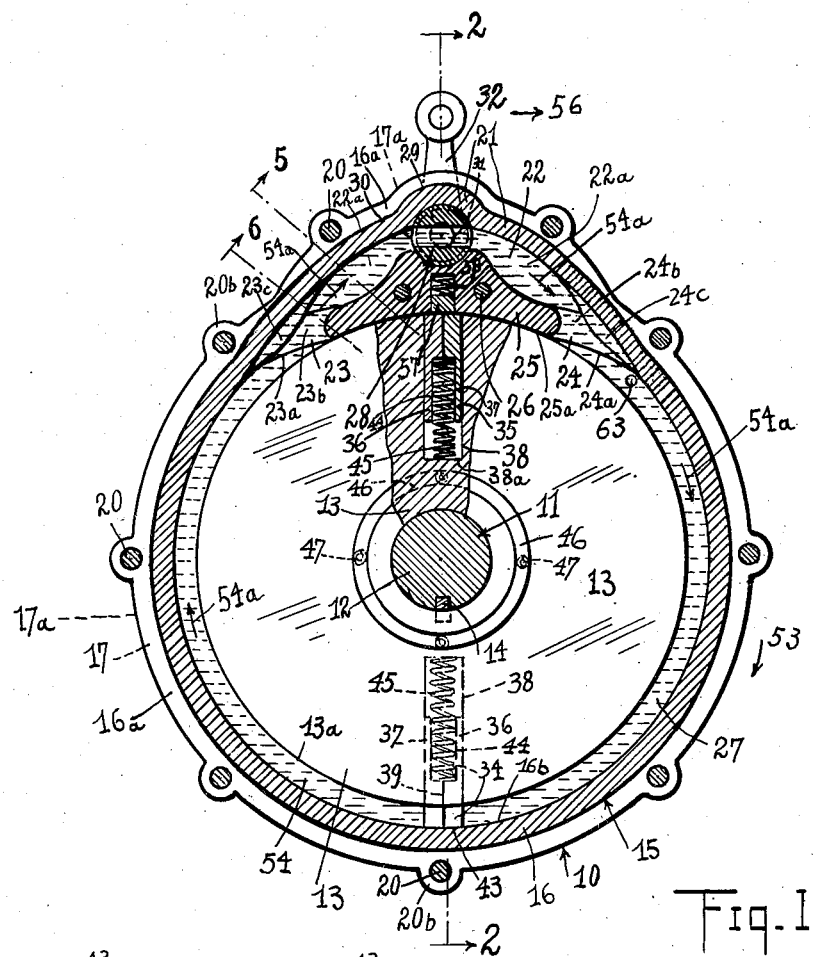
Fig. 1 is a cross sectional view of my novel fluid brake, attached on the axle of a motor vehicle, the section being taken on the line 1—1 of Fig. 2.
Fig. 3 is an elevational view of a sliding plate used in my device, the figure being on a larger scale than the earlier figures
Fig. 4 is an end view of said plate.
Figure 2:
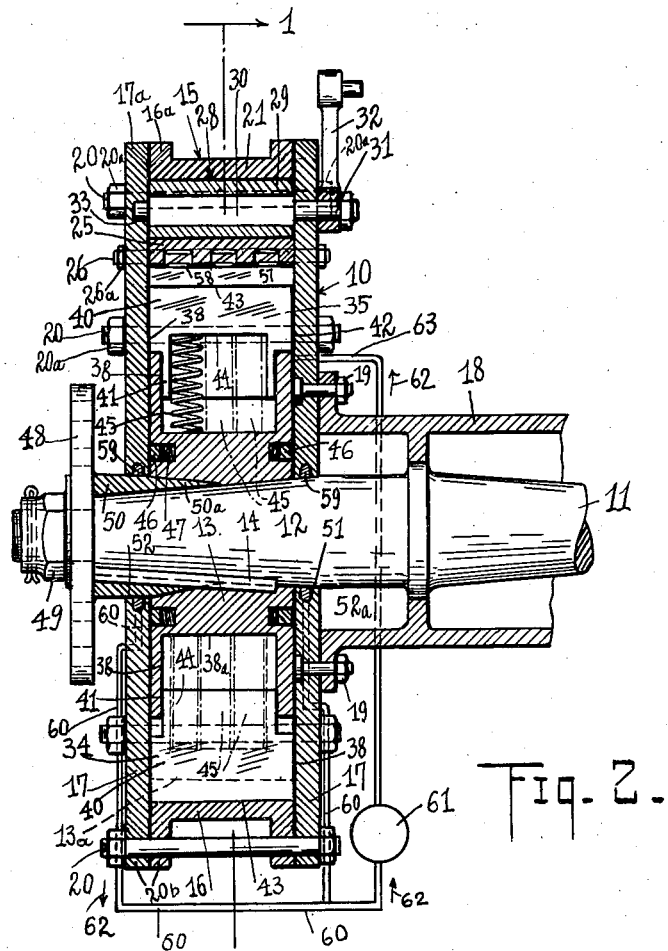
Fig. 2 is a longitudinal sectional view of the device of Fig. 1, the section being taken on the line 2—2 thereof.
Figure 5:
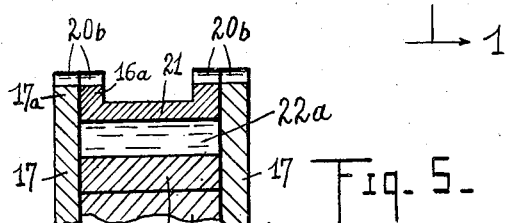
Figure 6:
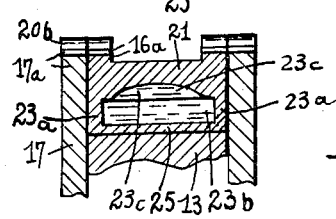

Figs. 5 and 6 are sectional details on the lines 5—5 and 6—6, respectively, of Fig. 1.

Referring now to the drawings more in detail by characters of reference, the numeral 10 indicates my brake device, in general, and the numeral 11 the axle or shaft on which it is mounted.

As will be seen from the drawings, the axle or shaft 11 has a conical pin 12, as usual with motor vehicles, on which cone the hub of the wheel is usually secured, and I employ my novel fluid brake on said conical pin.

My novel brake is composed of two main elements. One is a disk 13, which is secured on the axle as by the key 14, and is rotating therewith. A second element of my brake device is a circular housing, generally indicated by the numeral 15, and mainly composed of a comparatively wide and short hollow cylinder or ring 16, and two end plates 17 for the same, said brake housing 15 being secured on the stationary axle housing 18 of the motor vehicle, as by the bolts 19, or on some other relatively stationary part of the frame or chassis structure of the vehicle, and, of course, said housing will be relatively stationary in contrast to the rotating disk 13.

Heavy bolts 20 connect the end plates 17, securing them by nuts 20a on the open ends of the ring 16, thereby forming the cylindrical hollow casing 15. End plates 17 may be of larger diameters than the cylindrical ring 16, leaving a flange 17a therearound and a similar flange 16a may be provided at the ends of the cylinder 16, for better sealing. Semicircular extensions or lugs 20b may be provided in each flange where the bolts 20 connect them.

On one part of its periphery, the ring or hollow cylinder 16 has an outward bulge, generally indicated by the numeral 21, and a by-pass or channel 22 is formed in said extension or bulge, said channel having its termination openings or mouths 23 and 24 on the inner surface of the ring 16, said openings being spaced apart from one another to a desired extent.

The channel 22 is formed by an appropriately shaped block 25 cast into said bulge in the manner indicated in Fig. 1 and being further secured in its place by two bolts 26 the ends of which are fastened to the cover plates 17 as by nuts 26a.

The diameter of the rotating disk 13 is smaller than the inner diameter of the hollow cylinder 16, so that a ring space 27 is left between the two, the housing 15 being secured concentrically with the disk 13.

As will be seen presently, said ring space 27, and the by-pass channel 22, connecting two portions thereof, will be used for circulating a liquid medium, like oil, or a so called anti-freeze fluid, in my device, and to produce the braking effect by gradually closing the path to said circulation.

Between the two openings or mouths 23 and 24, of the channel 22, the inner wall 25a of the block 25 is of the same curvature as the outer circle or periphery 13a of the disk 13, so that said disk will closely slide at the place 25a on the inner wall of the block 25.

A valve device 28 is arranged in the channel 22, being of any appropriate construction, well known in this art. The embodiment shown in the drawings has a rotatable central cylinder 29 with a longitudinal slot 30 going through the major part thereof. A stem 31 of it projects through the adjacent cover plate 17 in a substantially liquid sealed manner and will have an operating arm 32 secured thereon, while its other stem 33 will be journalled in the opposite cover plate 27, preferably not passing through the same for better sealing.

The operation and use of my device may be noted from the herein description, as I am aware of the fact that many fluid brakes have been proposed in which a rotating disk is employed causing a fluid to circulate in a stationary part of the device, and when it is desired to use the brake, the circulation of said liquid medium will be stopped, thereby stopping the rotation of said disk, said disk being secured on, or connected to, the rotating element which it is desired to stop in such a manner that the stopping of the rotation of said disk will prevent the rotation of said element, like the axle or shaft of a vehicle.

In my device, the ring space or channel 27 and the by-pass 22, will be used for circulating the brake fluid by the rotation of the disk 13, and for this purpose two or more appropriately spaced inwardly and outwardly slidable pusher plates or blades will be arranged on the rotating disk 13, riding on the inner surface 16b of the ring 16 in a substantially liquid tight manner and causing the liquid in front of them to circulate through said channels, as will be obvious.

Normally, valve device 28 is set into an open position and its through-going slot or opening 30 will be registering with by-pass 22, so that the oil may freely circulate therethrough. When it is desired to produce a brake effect, said valve will be closed, gradually stopping the circulation of the oil, and gradually braking the motion to be stopped, and when said circulation is made entirely impossible it, of course, will prevent any further rotation of the disk 13, and thereby entirely stop the rotation of the shaft or axle 11 but in a gradual manner, if so desired.

In the embodiment shown in the drawings, two sliding plates or blades are indicated, generally designated by the numerals 34 and 35 respectively. Since the two blades and their arrangement in the rotating disk 13 are identical, the description of one will suffice.

I prefer to make each pusher plate or blade of two generally identical halves, indicated by the numerals 36 and 37 being placed in an appropriate slot 38 in the disk 13 closed on one another, their separation plane being indicated at 39. The outer contour of each half is identical and shows a wider outer portion 40 and a somewhat narrower inner portion 41 and the slot 38 in disk 13 will be formed accordingly. The wider outer portion 40 is of the same widths as the ring 16, so that its end or edge surfaces 42 will ride on the respective parts of the end plates 17, while its outer or top surface 43 will be of the same cylindrical curvature as the inner surface of the ring 16, so that it may rotate thereon. A downwardly hollow open space 44 is provided within each sliding pusher plate or blade in which is arranged a plurality of springs 45 having the tendency to press the outer surface 43 of the pusher plate against the inner surface 16a of the ring 16.

Two circular sealing rings 46 are arranged in corresponding circular slots in the two faces of the rotating disk 13, each ring 46 being outwardly pressed by a plurality of coiled springs 47 so as to tightly ride on the inner surface of the respective end plate 17.

As has been mentioned hereinbefore, the usual disk 48 is provided to carry the wheel of the vehicle, being secured on the cone pin 12 as by the nut 49, and said disk 48 may have a hub 50 having a reversely conical inner portion 50a which may be forced into an appropriate recess in the disk 13.

The end plates 17 will have central apertures 51 and 52 in which the axle may rotate in a substantially oiled and liquid sealed manner, as it is well known in this art. Space 52a may house the roller bearing for the axle.

The use and operation of my novel fluid brake will be apparent from the herein description and from the earlier remarks. Normally, the valve 28 is set into an open position, and as the axle 11 is rotated by the motor of the vehicle, disk 13 will rotate therewith, pusher plates 34 and 35 riding on the inner surface of the ring 16, as will be understood. The direction of the rotation is indicated in Fig. 1 by the arrow 53.

The oil or anti-free fluid or any other liquid medium will be placed into the ring space 27, as indicated at 54, and as the pusher plates 34 and 35 ride around, they will drive the oil before them in the direction of arrows 54a.

At the surface 25a the disk 13 rides in a sealing manner on the block 25 so that the oil cannot continue in the ring space 27, but it is forced to tabe the by-pass 22, as indicated by said arrows 54a.

As will be seen, when the pusher plate arrives to the sealing surface 25a, it will be pressed inwardly into the disk 13 the bottom 38a of the slot 38 being spaced deep enough to permit such movement and the springs 45 being temporarily compressed, and when the pusher plate leaves said sealing surface, springs 45 will press the same outwardly, so that its outer surface 43 again will ride in a sealing manner on the inner surface 16a of the ring 16.

When it is desired to break the rotation of the disk 13, valve 28 will be gradually closed, which may be effected from any distant place, as from the driver's seat, through any appropriate connection, well known in this art, acting on the arm 32, as indicated by the arrow 56.

When the valve 28 is entirely closed, pusher plate 34 will press the oil before it (arrow 54a) against the closed valve, until the rotation of the disk 13 will be made entirely impossible, as long as the parts resist, and as long as passing of the oil through the valve or over the sealing surface 25a, or backwards over the blade end 43, is prevented, as will be obvious.

To insure the tight sealing at the block 25 when the long portions of the periphery 13a of the disk 13, where no pusher plate is arranged, ride on it, a counter-inwardly pressed sealing plate 57 acted upon by coiled springs 58 may be arranged in the center of the block 25.

To insure a more sealing or tight running of the edge or side surface 42 of the pusher blades 34 and 35 on the end plates or covers 17, each half of each pusher plate may have a downward V-shaped incision, which for the half 36 is indicated at 36a and for the half 37 at 37a, and which incisions are placed in a staggered manner in the two halves. The incisions go to a great portion of the depth of the pusher blade, but do not go entirely through the same, and through their resiliency will cause the end or edge surfaces 42 to press on the respective covers 17. The two halves 36 and 37 may be secured together at their lower portions, as by spot welding, but so as to still permit said resilient actions of the incisions 36a and 37a.

It will be seen that my device may be built of a few comparatively simple parts, normally it will permit free and easy circulation of the brake fluid, but will tightly seal the same, even against very high pressure, when the valve 28 is closed. The block 25 and its associated parts prevent a leakage of the oil at that point. The pusher plates or blades will ride with a comparatively wide top surface and under the pressure of the springs 45 on the inner surface 16b of the ring 16, and on said block preventing the escaping of the oil at those places, while, in the normal operation of the device, the spring action on the end or side surfaces 42 of the pusher blades will seal the oil at the cover plates. Any oil or other liquid possibly escaping in very small quantities will be held back by the spring pressed sealing rings 46.

All the parts rotating with the device may be appropriately shaped and finished so as to easily slide on the respective stationary portions, and the spring pressures being comparatively light, normally, no appreciable counterforce or resistance will arise on account of their action. Their purpose is to insure a sealing contact, and, as the moving parts will be constantly and amply lubricated by the brake fluid itself, the rotation of the device will be easy, smooth, and will offer a negligibly small resistance only. As a further improvement on my device, I provide any of the usual appropriate oil catchers or retainers 59 in the openings 51 and 52, in which the respective parts of the axle 11 rotate, and the oil possibly caught there, will be gathered through the bores and tubes 60, as it will be understood, and, finally, returned into the fluid channel 27 either simply manually, or by any appropriate means as the pump 61 shown diagrammatically. Arrows 62 indicate the path of the oil, and 63 indicates the return into the device, which also may be used for replenishing.

The oil catchers or retainers 59 preferably are packings placed into appropriate grooves, as shown.

The portions 22a of the by pass 22 at both sides of the valve 28 may be made wider to reduce the resistance against the normal circulation of the brake fluid and said by pass 22 may have a transverse clearance all between the end plates 17 (Fig. 5) identical to the length of the opening 30 in the valve, for similar reasons. At the mouths 23 and 24 the by pass 22, however, is somewhat restricted and at each of these places two side ledges 23a and 24a may connect the block 25 with the ring wall 16 that is, said block and said ring is formed of one casting said ledges 23a and 24a holding block 25 within the protruding portion 21 of ring 16. In between said ledges 23a and 24a are the entrance, respectively, exit portions 23b and 24b of the by pass 22.

I also may provide recesses 23c and 24c at those points in the wall of the protruding portion 21, said recesses straddling the by pass portions 23b and 24b so that they, so to say, provide auxiliary by passes at the entrance and exit mouths 23 and 24, as will be obvious. The purpose of the auxiliary or secondary by pass 23c is to counteract the pressure on the sliding plates 34 and 35 when the valve 28 is being closed.

Supposing that the plate 34 is moving in the direction and position indicated in Fig. 1, and the operator begins to close valve 28 for a braking action, a backward pressure is acting on the left hand side face of the plate or blade 34 when it arrives to the mouth of the by pass 23 and starts to close. On account of the extreme quickness of this action at high speeds of revolution, this back pressure knocks the plate 24 against the side of the slot in the disk 13, causing unpleasant and harmful rattling. The pressure on the one, the left, side of the plate 34, also causes strong friction, makes its sliding harder and causes the plate and slot to wear out quicker. The auxiliary or secondary by pass 23c starting somewhat before the mouth of by pass 23, when the plate 34 starts to close said mouth, permits the back pressure to reach the other, right, side of plate 34, and counterbalances the back pressure acting on the left face thereof (as seen in Fig. 1) and the rattling as well as one sided pressure and wearing out of plate 34, will be prevented.

If the rotation of the axle 11 is the opposite, by pass 24c will have this role, and, in general, I may remark, that my device is adapted for braking the rotation of the axle in either direction.

What I claim as new is:

1. In a fluid brake for a rotating shaft, a disk secured on the shaft and rotatable therewith, a relatively stationary cylindrical housing concentric with said disk but of a larger diameter, leaving a ring shape channel between them, two end walls for said housing, slidably but substantially sealingly engaging the two sides of said disk, said shaft being substantially sealingly journalled in said end walls, an inwardly projecting cam portion for said cylindrical housing slidably but sealingly engaging a portion of the periphery of said disk, inwardly and outwardly slidable blades in said disk, resilient means pressing said blades outwardly against the inner surface of said cylindrical housing, and said cam, respectively, a by-pass in said cam connecting the portions of said channel before and after said cam, a liquid substantially filling said channel and said by-pass, and a valve device in said by-pass, whereby, when said valve is opened, on the rotation of said disk, said blades will cause said liquid to circulate in said channel and through said by-pass, but upon the closing of the said valve, said circulation will be prevented and the rotation of said shaft stopped, said blades being made of two identical halves each having an incision from the outer end downwardly to make said outer ends resilient whereby the side edges of the blades will ride on said end walls in a sealing manner.

2. In a fluid brake for a rotating shaft, a disk secured on the shaft and rotatable therewith, a relatively stationary cylindrical housing concentric with said disk but of a larger diameter, leaving a ring shape channel between them, two end walls for said housing, slidably but substantially sealingly engaging two sides of said disk, said shaft being substantially sealingly journaled in said end walls, an inwardly projecting cam portion for said cylindrical housing slidably but sealingly engaging a portion of the periphery of said disk, inwardly and outwardly slidable blades in said disk, resilient means pressing said blades outwardly against the inner surface of said cylindrical housing and said cam, respectively, a by-pass in said cam connecting the portions of said channel before and after said cam, a liquid substantially filling said channel and said by-pass, and a valve device in said by-pass, whereby, when said valve is opened, on the rotation of said disk, said blades will cause said liquid to circulate in said channel and through said by-pass, but upon the closing of the said valve, said circulation will be prevented and the rotation of said shaft stopped, a circular slot in each face of the disk concentric therewith, a ring in each slot, and resilient means to the rear of each ring pressing the same outwardly against the respective covers to reduce the escape of the liquid.

3. In a fluid brake for a rotating shaft, a disk secured on the shaft and rotatable therewith, a relatively stationary cylindrical housing concentric with said disk but of a larger diameter, leaving a ring shape channel between them, two end walls for said housing, slidably but substantially sealingly engaging two sides of said disk, said shaft being substantially sealingly journalled in said end walls, and inwardly projecting cam portion for said cylindrical housing slidably but sealingly engaging a portion of the periphery of said disk, inwardly and outwardly slidable blades in said disk, resilient means pressing said blades outwardly against the inner surface of said cylindrical housing and said cam, respectively, a by-pass in said cam connecting the portions of said channel before and after said cam, a liquid substantially filling said channel and said bypass, and a valve device in said by-pass, whereby when said valve is opened, on the rotation of said disk, said blades will cause said liquid to circulate in said channel and through said by-pass, but upon the closing of the said valve, said circulation will be prevented and the rotation of said shaft stopped, a circular slot in each face of the disk concentric therewith, a ring in each slot, and resilient means to the rear of each ring pressing the same outwardly against the respective covers to reduce the escape of the liquid, a second by-pass starting outside of each mouth of said first by-pass to allow a backward travel of the pressure in the fluid when said valve is being closed, to act on the rear surface of the respective blade and counteract the pressure on the front side of it.

4. In a fluid brake, as set forth in claim 3, said second by-pass being formed by a recess in the wall of said cylindrical housing and bridging said mouth.

5. In a fluid brake having a cylindrical housing, a rotatable disk therein, a channel between them having a closed portion, a by-pass around the closed part of the channel, and a valve in said by-pass, a fluid medium in said channel, and inwardly and outwardly slidable blades in said rotatable disk whereby a closing of said valve will stop the circulation of said fluid and break said rotation, said disk being concentric with said housing, and said channel generally being of a circular ring shape, a second by-pass starting outside of each mouth of said first by-pass to allow a backward travel of the pressure in the fluid when said valve is being closed, to act on the rear surface of the respective blade and counteract the pressure on the front side of it.

STEVEN PRIBULA.